Jan. 10, 1956    K. A. PRICE ET AL    2,730,394
QUICK-RELEASE DOOR LATCH

Filed Jan. 12, 1953    2 Sheets-Sheet 1

INVENTORS:
KENNETH A. PRICE
ROBERT E. SLATER

Their Patent Attorney

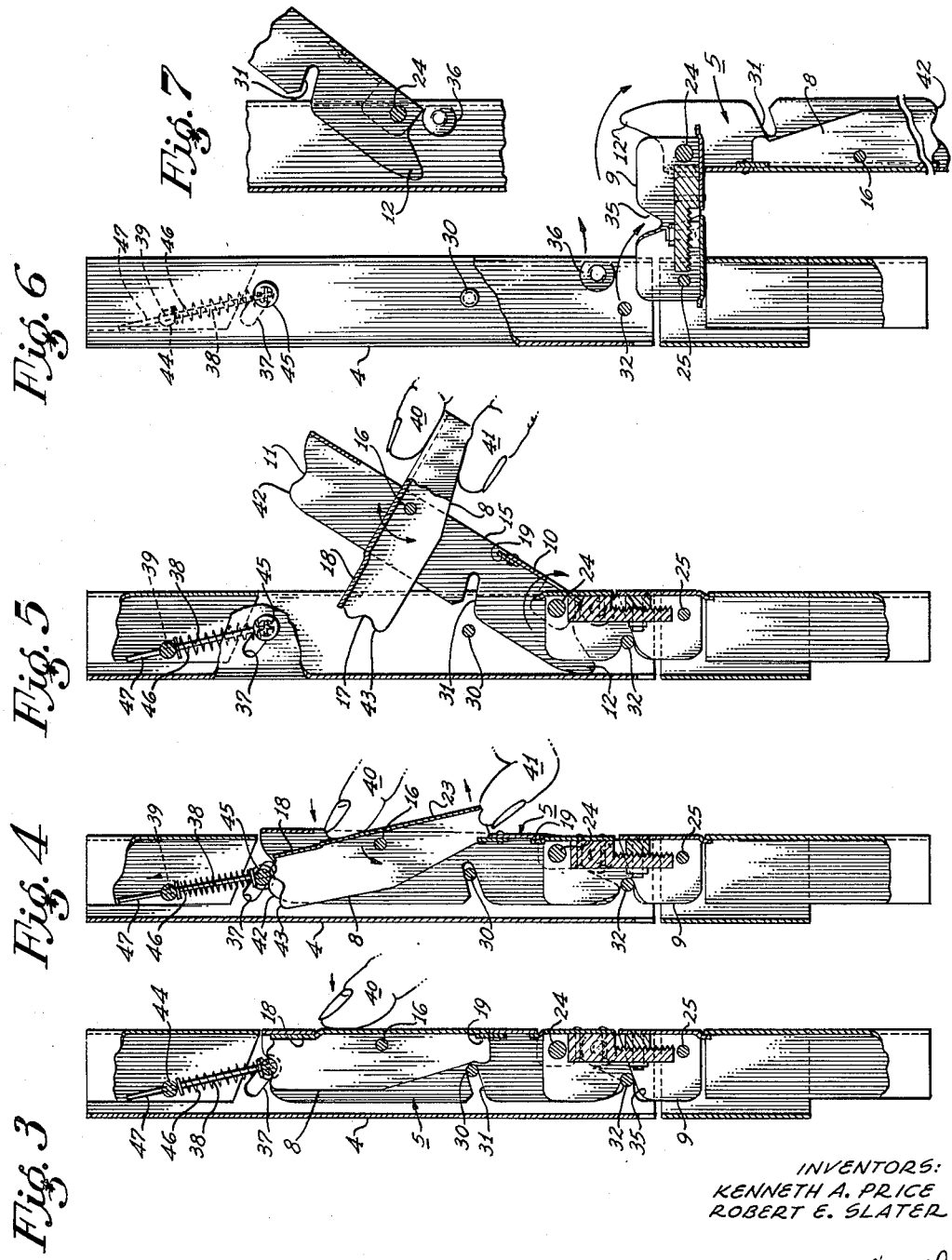

United States Patent Office 2,730,394
Patented Jan. 10, 1956

2,730,394

QUICK-RELEASE DOOR LATCH

Kenneth A. Price and Robert E. Slater, Pacific Palisades, Calif., assignors to Northrop Aircraft, Inc., Hawthorne, Calif., a corporation of California Application January 12, 1953, Serial No. 330,674

10 Claims. (Cl. 292—256)

Our invention relates to the field of closure fasteners and more particularly to those capable of carrying lineal tensile stress through the structural members fastened without any concomitant lateral movement.

One main object of this invention is to provide a cam levering latch having, in addition to high resistance to lineal tension stresses, structural means for resisting all shearing stresses and preventing relative lateral movement of the latch components and the parts or body sections they hold in attachment.

Another important object of this invention is the provision of a latching fastener, as hereinafter described, having resistance not only to forces inducing sidewise and diagonal relative lateral movement, but also to compressive forces along the longitudinal axis of the fastener which might tend to increase the overlap of the latch members causing an insert portion to override its point of normal engagement and be forced forwardly out of the receptor socket.

A further object of this invention is the provision of a latching fastener having pivotal projections on an insert member adapted to encircle the attachment points on a receptor fastening member and thus resist forces tending to lift one fastening member vertically from the normally horizontal plane of engagement.

Another main object of this invention is the provision of a latching fastener adapted to be quickly attached or detached by manual means without the use of tools of any kind, and having inherent position-indicating means which show, externally, whether the fastener is loosely engaged, half locked, or completely latched in firm engagement.

A still further object of this invention is the provision of a latching fastener having no spring loading which contributes to its detachment and which therefore requires definite and intentional manual operation to unlock and separate the two fastening members.

Another object of this invention is to provide a latching fastener having a separately movable trigger member which controls the operation of the locking mechanism and which serves also as a handle member by means of which an insert portion of the fastener is positively moved into position to be readily engaged by the operator and removed from engagement with a receptor portion of the latch.

An additional important object of this invention is the provision of a latching fastener so designed that its parts, except for a few bolts and machine screws, can be extruded or can be made by simple metal stamping methods or with ordinary routing and forming equipment generally found in aircraft sheet metal departments, and requiring very little close tolerance fitting and no die cast parts thus avoiding the attendant cost of dies and tooling.

Among other objects of this invention is the provision of a latching fastener, having, in addition to the above stated objects, the following secondary but collectively important construction features: (1) inconspicuous external appearance which does not invite experimental operation by bystanders, (2) no screws, rivets, or operative parts visible on the outer surface of the latch, (3) flush alignment with adjacent sections of the structural surface, (4) weatherproof and self-draining features, (5) provision for lineal adjustment between an insert portion and point of permanent attachment to the main structure, and (6) double jointed hinge fittings which, when the latch is mounted vertically, swing the insert portion completely out of the way when detached from the door or inspection plate.

In brief, our invention comprises a latching fastener suitable for securing a hinged door or removable inspection plate, having high resistance to shear, tension and compression forces, adapted to exert powerful cam-type lineal contraction to draw the edges of the parts together, and easily attached or detached by simple manual means.

For a complete disclosure of our invention, a detailed description of a preferred embodiment will now be given in connection with the accompanying drawings forming a part of the specification wherein.

Figure 2:
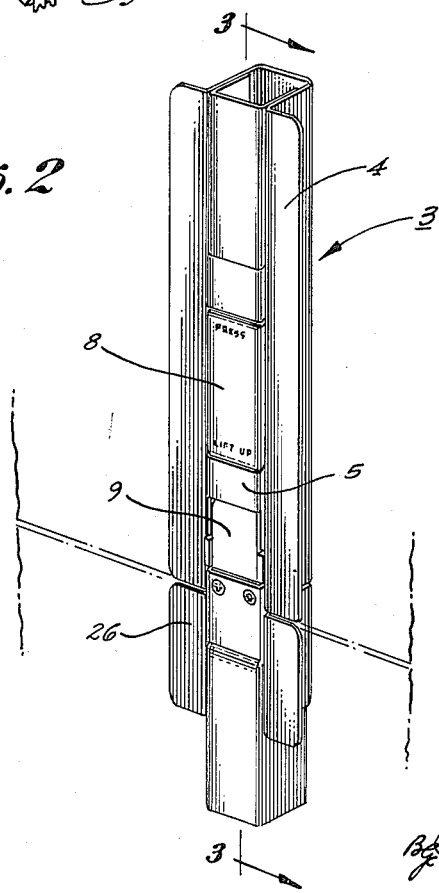
Figure 2 shows the latch of our invention on a larger scale in its assembled position, the insert portion resting snugly within the receptor portion and latched in place flush with the surface of the structural plating.

Figures 3, 4, 5 and 6 are cross sections on the line 3—3 of Figure 2, Figure 3 showing the closure fastener about to be released, Figure 4 showing the fastener after depression of a trigger member, Figure 5 showing an insert portion being withdrawn from the receptor portion by means of raising the trigger member, and Figure 6 showing the insert member completely withdrawn and resting on a hinging member which joins the structure to the insert.

Figure 7 is a fragmentary section of a claw-like cam surface of the insert member about to engage a positioning stud of a receptor member.

Figure 1:
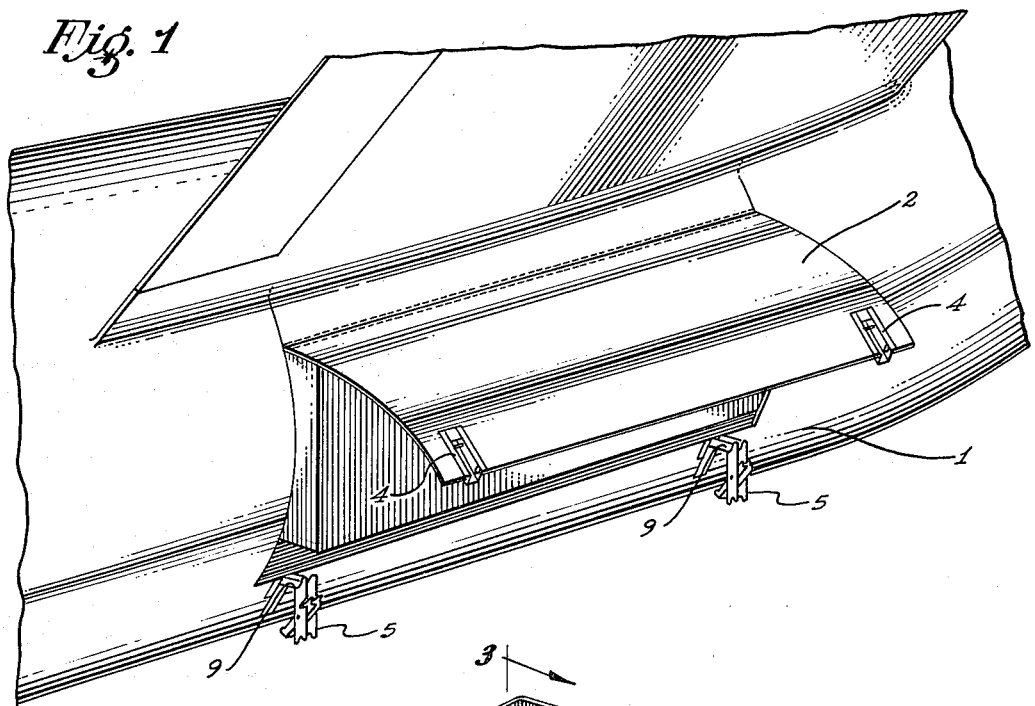
Figure 1 shows the closure fastener in an unlatched position in conjunction with structural sections to be latched, the receptor portion of the fastener being located on the movable structural member.

For a detailed description of our invention, reference is made to the drawings. In Figures 1 and 2 a structural member 1 is to be readily releasably secured to a second structural member 2, by a latch 3, both members being represented by skins of an airplane. The assembled latch 3, shown in Figure 2, comprises four major elements, viz., a receptor member 4, an insert member 5, a trigger member 8, and a hinge member 9.

Referring to Figures 3 through 6 the insert member 5 is formed with a U-shaped channel 10 and is provided with latch engaging notches 11 at one end. The other end of the insert member 5 is formed with outward curving claw-like cam surfaces 12. The back portion of the U-shaped channel 10 is formed with a cutout 15. Working in the cutout 15 is a trigger channel member 8 connected to the insert member 5 by a pin 16 about which the trigger member 8 is able to pivot within the insert member 5. Formed at one end of the trigger member 8 are latch engaging notches 17. The trigger member 8 is constrained in its rotatable motion by forming it with a down-set 18 at one end and forming the insert member 5 with a down-set 19 at the other end. Thus when the latch engaging notches 11 and 17 are in coincidence, the trigger member 8 will lie flush within the insert member 5.

Securing the insert member 5 to the structural member 1 is a segmented hinge member 9. The hinge member 9 is pivotally connected to the insert member 5 by a pin 24 and to the structural member 1 by a pin 25 mounted in a channel shaped member 26 rigidly secured to structural member 1. Thus, the insert and hinge members 5 and 9 may pivot as a unit about pin 25.

A channel receptor member 4 is secured in place in the complementary structural member 2 and is so formed that the insert member 5 fits snugly therein. The receptor member 4 is provided with a transverse thrust bar 30 to be engaged by deep notches 31 cut in the parallel sides of insert member 5. A second thrust bar 32 is also provided in the receptor member 4 and is likewise engaged by deep notches 35 in the sides of hinge member 9. The purpose of the aforementioned thrust bars is to prevent unlatching due to external lineal compressive forces.

Two positioning studs 36 are attached to the inner surfaces of the sides of the receptor member 4, as best seen in Figures 6 and 7, and are engaged by the cam surfaces 12 of the insert member 5 which rotate about pin 24 and engage between the studs 36 and the closed side of the receptor member as shown in Figure 7, thus drawing the complementary structural members 1 and 2 together in position to be latched. Located near the other end of the receptor member 4 on both side walls are slanted grooves 37. A spring loaded T-bar 38 is placed within the grooves 37 at one end and through an aperture 39 in a supporting cross bar 44 at the other end. Thus when the bar 38 is acted upon by an external force, such as the depression of the trigger 8, the notch surfaces 43 will cause the head of the bar 45 to be disposed within the grooves 37, and the spring 46 to be compressed against the cross bar 44, while the extended end of the bar 38 moves outwardly through the aperture 39.

To better understand our invention, a description of its operation hereinafter follows:

Figure 3 shows the fastener in normal locked position while Figures 4 through 6 depict the opening of the latch in sequential stages. The trigger member 8 is depressed by finger 40, causing the latch engaging notch surfaces 43 to depress the latch bar 38 within the grooves 37. Thus depressed, the portion 23 of the trigger 8 rearward of the pivot pin 16 is exposed and may be grasped with the thumb 41, shown in Figure 4. The exposed portion 23 is then lifted upward causing the trigger camming surfaces 43 to rotate downwardly against the bottom of receptor member 4 which tends to raise the insert member 5 thus causing the camming surfaces 42 to further depress the latch bar 38, hence releasing the insert member 5. The insert member 5 and the hinge member 9 are removed entirely from the receptor member 4 by continuing the upward pull on the trigger member 8 as shown in Figures 5 and 6.

To close the latch 3 it is merely necessary to position the claw-like camming surfaces 12 around the positioning studs 36, align the flat portions of the trigger and insert members 23 and 10, and press the unit in position as shown in Figure 2. The latch engaging notches 11 and 17, coincidently positioned, will engage the spring bar 38 by first depressing it within the slanted grooves 37 by virtue of the contact between the bar 38 and the notch camming surfaces 42 and 43 of the insert and trigger members 5 and 8.

While in order to comply with the statute, the invention has been described in language more or less specific as to structural features, it is to be understood that the invention is not limited to the specific features shown, but that the means and construction herein disclosed comprises a preferred form of putting the invention into effect, and the invention is therefore claimed in any of its forms or modifications within the legitimate and valid scope of the appended claims.

What is claimed is:

1. A closure fastener comprising: a channel type insert member having latch engaging camming notches at one end and positioning cams at the other end; a receptor member having a channel cavity and adapted to be secured to a structural member; positioning studs near one end of said receptor around which said positioning cams pivot, said cams causing lineal contraction between said insert and receptor members; a segmented hinge for securing said insert member to a complementary structural member to be latched to aforementioned structural member, said hinge being effective to enable said insert to pivot with respect to said hinge at the insert cam end; and a latch placed within said receptor member effective to engage said insert engaging camming notches.

2. A closure fastener in accordance with claim 1 further characterized by a trigger channel, said channel being attached to said insert member so as to pivot with respect thereto and having latch engaging camming notches at one end, said notches lying coincident with those of said insert member when said insert and trigger members are flush with respect to one another.

3. A closure fastener in accordance with claim 2 further characterized by the fact that said insert channel is provided with a cutout in the back thereof and that said trigger channel is pivotally attached intermediate the length of the cutout to said insert channel so that one end of said trigger channel can at times move outwardly through said cutout whereby an inward movement of one end of the trigger channel causes a corresponding outward movement of the other end, said trigger channel movement being constrained so that the latch engaging camming notches thereof cannot move outward after the notches approach coincidence with those of the insert member and likewise, the opposite end of said trigger channel member is constrained from further inward movement after coincidence of said notches is reached.

4. A closure fastener in accordance with claim 3 further characterized by the fact that said receptor cavity has slanted grooves in its channel sides and that said latch is a spring loaded T-bar, said bar being disposed within said grooves under the engaging force of the camming surfaces of said notches, and likewise disposed under the disengaging force of said cam surfaces.

5. A closure fastener in accordance with claim 4 further characterized by transverse thrust bars placed within said receptor cavity and deep notches placed in said insert and hinge members, said notches being effective to engage said thrust bars.

6. A closure fastener comprising: a channel type insert member having latch engaging camming notches formed at one end; a receptor member having a channel cavity with grooves therein, said receptor member being so formed that said insert member fits snugly therein and lies flush with respect thereto; and a latch placed within said receptor grooves, said latch being effective to be disposed within said grooves under the engaging force of the camming surfaces of said engaging notches, and likewise disposed under the disengaging force of said camming surfaces.

7. A closure fastener in accordance with claim 6 further characterized by a trigger channel, said channel being attached to said insert member so as to pivot with respect thereto and having latch engaging camming notches at one end, said notches lying coincident with those of said insert member when said insert and trigger members are flush with respect to one another.

8. A closure fastener in accordance with claim 7 further characterized by the fact that said insert channel member is formed with a cutout in the back thereof and that pivotally attached to said insert channel member, intermediate the length of said cutout, is said trigger channel, said trigger channel and said cutout so formed that an inward movement of one end of said trigger channel causes a corresponding outward movement of the other end, said trigger movement being constrained so that the notch engaging end cannot move outward after the notches approach coinsidence with those of the insert member, and likewise, the other trigger channel end cannot move inward after coincidence of said notches is reached.

9. A closure fastener in accordance with claim 8 further characterized by the fact that said latch is a T-bar having a compression spring placed thereon at its extended side so that said latch is caused to engage said notches after being momentarily displaced by said notch camming surfaces.

10. A closure fastener in accordance with claim 9 further characterized by transverse thrust bars placed within said receptor cavity and deep notches placed in said insert member, said notches being effective to engage said thrust bars.

References Cited in the file of this patent

UNITED STATES PATENTS

| | | |
|---|---|---|
| 2,424,962 | Best | Aug. 5, 1947 |
| 2,613,974 | Llewhellin | Oct. 14, 1952 |
| 2,653,842 | Love | Sept. 29, 1953 |

FOREIGN PATENTS

| | | |
|---|---|---|
| 610,446 | Great Britain | Oct. 15, 1948 |
| 981,093 | France | Jan. 10, 1951 |